United States Patent
Yoshida et al.

(10) Patent No.: US 6,253,487 B1
(45) Date of Patent: Jul. 3, 2001

(54) WATER-STORING TRAY FOR PLANT CULTIVATION MAT AND ARRANGEMENT THEREOF

(75) Inventors: Minoru Yoshida; Kazuo Kumura, both of Yamato; Takaharu Yoshioka, Sagamihara; Shinji Uchida, Toride, all of (JP)

(73) Assignee: Kyodo Ky-Tec CORP, Tokyo (JP)

( * ) Notice: Subject to any disclaimer, the term of this patent is extended or adjusted under 35 U.S.C. 154(b) by 0 days.

(21) Appl. No.: 09/317,623

(22) Filed: May 25, 1999

(30) Foreign Application Priority Data

Jun. 1, 1998 (JP) .................................. 10-151576

(51) Int. Cl.$^7$ ................. A01G 1/00; A01G 9/02
(52) U.S. Cl. ................................ 47/33; 47/86
(58) Field of Search ................ 47/33, 86, 87, 47/75, 56, 65.5, 66.1, 66.5, 66.6

(56) References Cited

U.S. PATENT DOCUMENTS

| | | | | |
|---|---|---|---|---|
| 3,651,976 | * | 3/1972 | Chadbourne | 47/86 |
| 4,099,345 | * | 7/1978 | Loads | 47/56 |
| 4,926,586 | * | 5/1990 | Nagamatsu | 47/86 |
| 4,955,499 | * | 9/1990 | Petty | 47/66.1 |
| 5,363,592 | * | 11/1994 | Weder et al. | 47/75 |
| 5,507,116 | * | 4/1996 | Gao | 47/87 |
| 5,870,857 | * | 2/1999 | Yerich | 47/75 |
| 5,911,632 | * | 6/1999 | Ko | 47/56 |
| 5,996,280 | * | 12/1999 | Michailiuk | 47/86 |

\* cited by examiner

*Primary Examiner*—Charles T. Jordan
*Assistant Examiner*—Elizabeth Shaw
(74) *Attorney, Agent, or Firm*—Armstrong, Westerman, Hattori, McLeland & Naughton, LLP

(57) ABSTRACT

The present invention aims at providing the water-storing tray for the plant cultivation mat, with the concomittant objects of ameliorating the water irrigation function in the plant cultivation mat as well as of facilitating control of the water content in the soil. An additional object is to much more stabilize the plant cultivating arrangement as a whole on the mat laying surface. Disclosed is a water-storing tray for plant cultivation mat, which is characterized in that a linkage part having a substantially hook-shape in its cross-section and a large breadth on its upper surface is provided externally on the upper end part of at least one side wall of the water-storing tray, and a linkage part having a substantially hook-shape in its cross-section and a small breadth on its upper surface is provided externally on the upper end part of the other side wall. It is preferable that the side end part of the linkage part at the required location is cut out, and the upper surface of the linkage part having a large breadth on its upper surface is brought to a level higher than the upper surface of the linkage part having the small breadth on its upper surface. Further, the inside of the water-storing tray should preferably be defined into a plurality of water storage cells, and a concaved groove be formed at the required location of the upper end part of the side wall. Desired water-storing trays are selected from among the abovementioned water-storing trays, and the linkage part having the large breadth on its upper surface and the linkage part having the small breadth on its upper surface are mutually engaged to be arranged continuously on the mat laying surface.

13 Claims, 13 Drawing Sheets

WATER-STORING TRAY FOR PLANT CULTIVATION MAT AND ARRANGEMENT THEREOF

BACKGROUND OF THE INVENTION a) Field of the Invention

This invention relates to a plant cultivation mat (or grass growing mat) to be laid on the roof top, veranda, terrace, etc. of buildings (in particular, an artificial ground) for growing various plants such as, especially, ground-covering plants like lawn, etc., grasses, flowers, vegetables, and so forth, and to a water-storing tray for such plant cultivation mat.

b) Description of Prior Arts

It has been the conventional practice that, in the case of cultivating or growing plants at a location having a flat laying surface such as roof top, veranda, terrace, etc. of a building, a water-prevention layer and a root-protection layer are formed (or a water-prevention sheet or a root-protection sheet is laid) over such flat laying surface, and then soil is spread over the layer or sheet to cultivate ground-covering plants such as lawn, grasses and shrubs, vegitables, and so forth (vide: for example, laid-open gazette of Japanese Patent Application No. 4-99411).

With the abovementioned method of spreading soil on the artificial ground, however, there arises necessity for providing plant cultivation arrangement such as water-prevention layer, root-protecting layer, etc., which give rise to various problems such that the equipment can hardly be adopted in those existing buildings, and, even when it is adopted in new buildings, cost to be borne would become prohibitively high. In addition, for the installation of the abovementioned plant cultivation arrangement, a large-scaled working would become necessary with the consequence that much time and labor are needed.

On the other hand, the service life of the water prevention layer is in general said to last from 10 to 15 years. Besides its service life, when unexpected damages occur to the water-prevention layer and the laying surface of the plant cultivation mat due to the plant cultivation work, it becomes also necessary to remove the plants under cultivation and the soils for cultivation with a view to repairing such water prevention layer against its water leakage. Again, enormous amount of time and labor are needed for this removing work.

SUMMARY OF THE INVENTION

The present invention has been made in view of the afore-described points of problem, and aims at providing the water-storing tray for the plant cultivation mat, with the concomitant object of perfecting the water irrigation function in the plant cultivation mat as well as of facilitating control of the water content in the soil.

A further object of the present invention is to stabilize the plant cultivation arrangement as a whole in respect of laying the plant cultivation mat, while ameliorating its water irrigation function.

According to the present invention, in one aspect thereof, there is provided a water-storing tray for plant cultivation mat, which is characterized in that a substantially hook-shaped linkage part in its cross-section is provided externally of the upper end part of at least one side wall of the water-storing tray.

According to the present invention, in another aspect thereof, there is provided a water-storing tray for plant cultivation mat, which is characterized in that a linkage part having a substantially hook-shape in its cross-section and a large breadth on its upper surface is provided externally on the upper end part of at least one lateral wall of the water-storing tray, and a linkage part having a substantially hook-shape in its cross-section and a small breadth on its upper surface is provided externally on the upper end part of the other side wall.

According to the present invention, in still another aspect thereof, there is provided a water-storing tray for plant cultivation mat, which is characterized in that, each of the side end parts of said linkage part having the large breadth on its upper surface and said linkage part having the small breadth on its upper surface has been cut out at a required location.

According to the present invention, in further aspect thereof, there is provided a water-storing tray for plant cultivation mat, which is characterized in that the upper surface of the linkage part having the large breadth is brought to a level higher than the upper surface of the linkage part having the small breadth.

According to the present invention, in still further aspect thereof, there is provided a water-storing tray for plant cultivation mat, which is characterized in that a plurality of water storage cells are defined within the tray by use of cell defining members.

According to the present invention, in still further aspect thereof, there is provided a water-storing tray for plant cultivation mat, which is characterized in that concaved grooves are formed at required locations in the upper end part of the lateral walls thereof.

According to the present invention, in still further aspect thereof, there is provided water-storing tray arrangement for plant cultivation mat using the above-described water-storing tray for plant cultivation mat, which is characterized in that desired water-storing trays are selected for use from among the above-described water-storing trays in the water-storing tray for the plant cultivation mat, and the abovementioned linkage part having the large breadth on the upper surface and the abovementioned linkage part having the small breadth on the upper surface are mutually engaged to be arranged continuously on the mat laying surface. This water-storing tray arrangement for plant cultivation mat is further characterized in that a space formed by the upper end surface of the side wall of the water-storing tray and the side wall of each opposing plant cultivation mat spread in the water-storing tray is made a space part for laying a water supply pipe.

In case the abovementioned water-storing tray arrangement for the plant cultivation mat is laid on the mat laying surface having an inclined portion, if use is made of a plurality of water-storing trays, each tray being of such a construction that a linkage part having a large breadth on its upper end part of at least one side wall is provided externally, and another linkage part of a small breadth on the upper surface of other lateral wall opposing the abovementioned one side wall, it is preferable to lay the water-storing tray by positioning the side wall, where the linkage part having the large breadth on its upper surface is provided, downward of the inclined surface, and to engage the linkage part having the small breadth on its upper surface with the linkage part having the large breadth on its upper surface of the other water-storing tray, the other water-storing tray being laid upward one after another.

Since the abovementioned water-storing trays can be mutually connected together by use of, for example, a hook-shaped linkage part, wherein the upper surface of the linkage part having the small breadth of a water-storing tray is mounted by the upper surface of the linkage part having the large breadth of the other water-storing tray to be positioned adjacently one over the other, it becomes possible to combine a multitude of water-storing trays, whereby the water-storing tray for the water irrigation of the bottom surface of the plant cultivation mat having much larger area can be laid. In this way, the water-irrigation function of the plant cultivation arrangement can be much more improved, hence stable laying of the plant cultivation arrangement can be realized.

And, by bringing the upper surface of the linkage part having the large breadth to a level higher than the upper surface of the linkage part having the small breadth, as by, for example, providing the upper surface of the linkage part having the large breadth at a level higher than the upper surface of the linkage part having the small breadth for the plate thickness of the linkage part having the small breadth, the bottom surface of each of the water-storing trays can be joined by the hook-shaped linkage part, without its being floated with respect to the laying surface of the plant cultivation mat, when the linkage part having the small breadth and the linkage part having the large breadth of each water-storing tray are to be disposed contiguously, in case of laying a plurality of water-storing trays on the laying surface of the plant cultivation mat. As the consequence, the water-storing tray as laid or the plant cultivation mat to be provided in the water-storing tray can be maintained in a more stabilized condition.

Further, by cutting out a desired location in each of the substantially hook-shaped linkage parts, in cross-section, consisting of the upper surface and the pendent part, at the corner part of the water-storing trays where the linkage part having the large breadth and the linkage part having the small breadth of the water-storing tray come into contact, it becomes possible to prevent the water-storing tray from being floated, which is caused by the superposition of one linkage part upon another at the abovementioned corner part at the time of laying each water-storing tray, where by the water-storing tray and the plant cultivation mat can be laid in their more stabilized condition.

Further, in the case of laying a plurality of water-storing trays on the mat laying surface having an inclination, the water-storing trays are laid one after the other in such a manner that the side walls provided with the linkage part having the large breadth may be positioned downward of the inclined surface, whereby water supplied from the upper part of the inclined surface to the plant cultivation mat and the water-storing tray can flow downward sequentially, whereby the water-irrigation can be effected without leakage and loss. By the way, a space is defined between the upper end surface of the side wall of the water-storing tray and the lateral wall opposite to each plant cultivation mat laid in the water-storing tray, in which space a water supply tube can be laid.

The foregoing objects, other objects as well as the specific construction and function of the present invention will become more apparent and understandable from the following detailed explanations thereof, when read in conjunction with the accompanying drawing.

BRIEF EXPLANATION OF THE ACCOMPANYING DRAWING

DETAILED DESCRIPTION OF THE INVENTION

Figure 1:
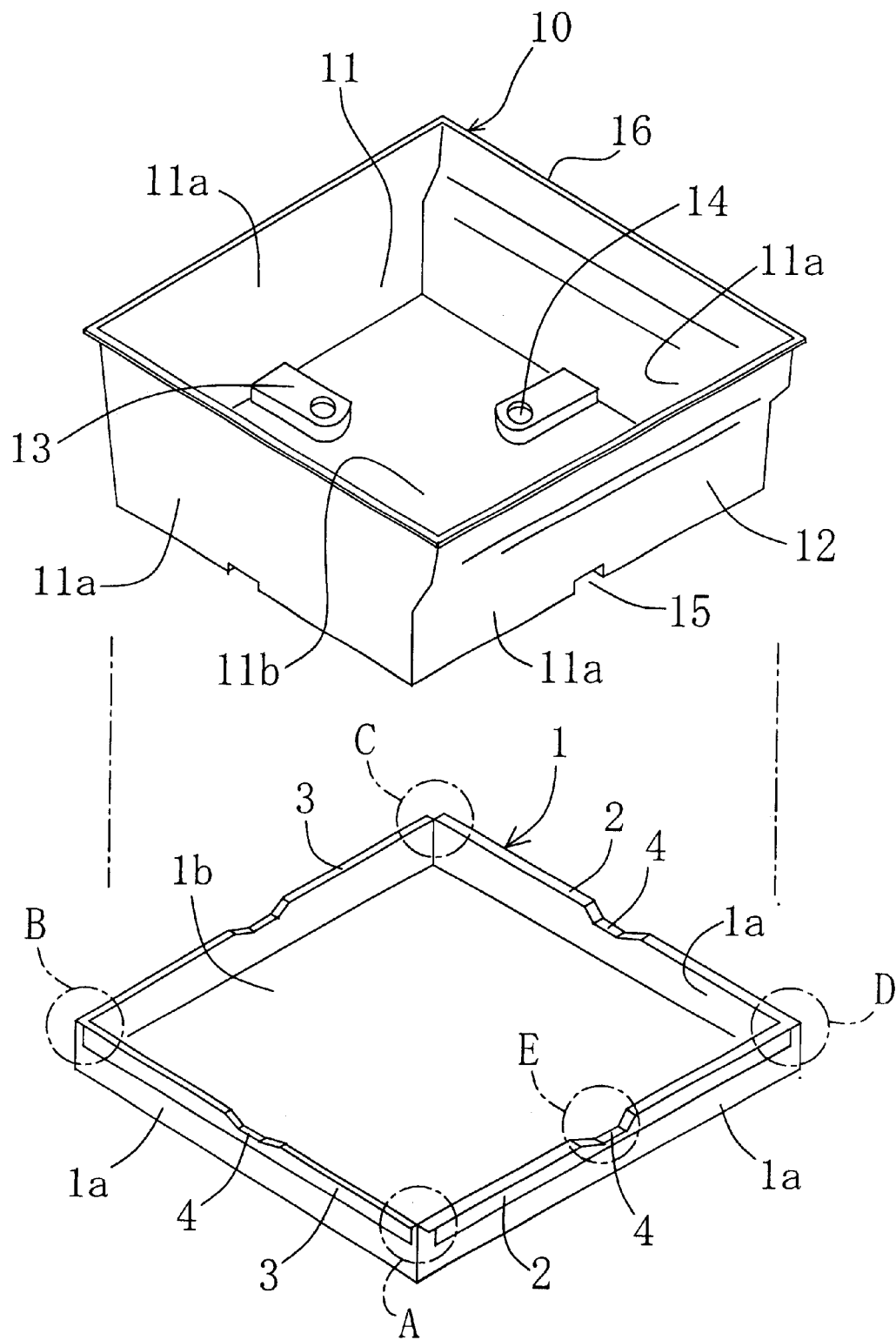
FIG. 1 is a perspective view showing the first embodiment of the plant cultivation mat and the water-storing tray according to the present invention.
Figure 2:
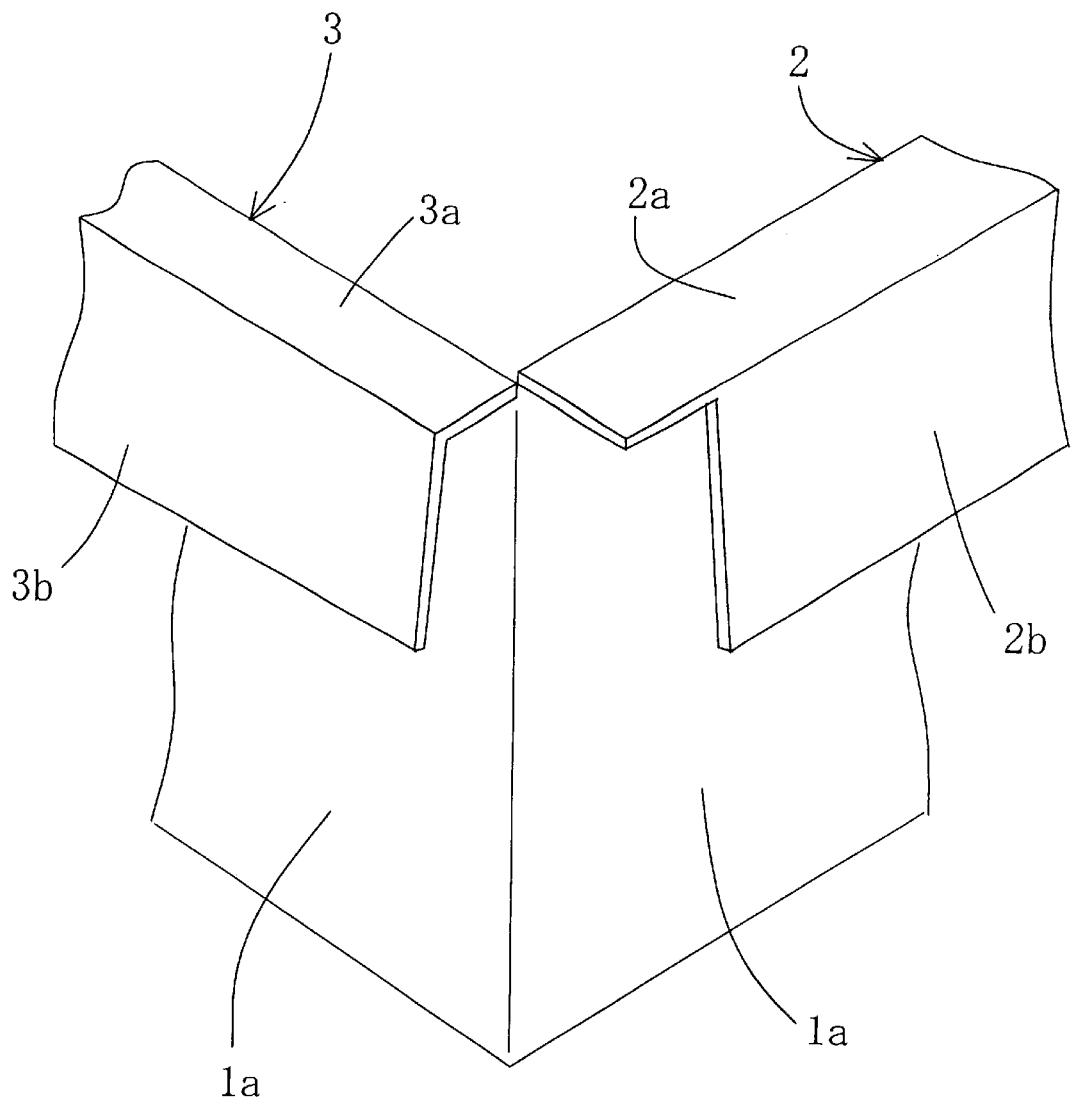
FIG. 2 is an enlarged perspective view showing the corner part A in FIG. 1.
Figure 3:
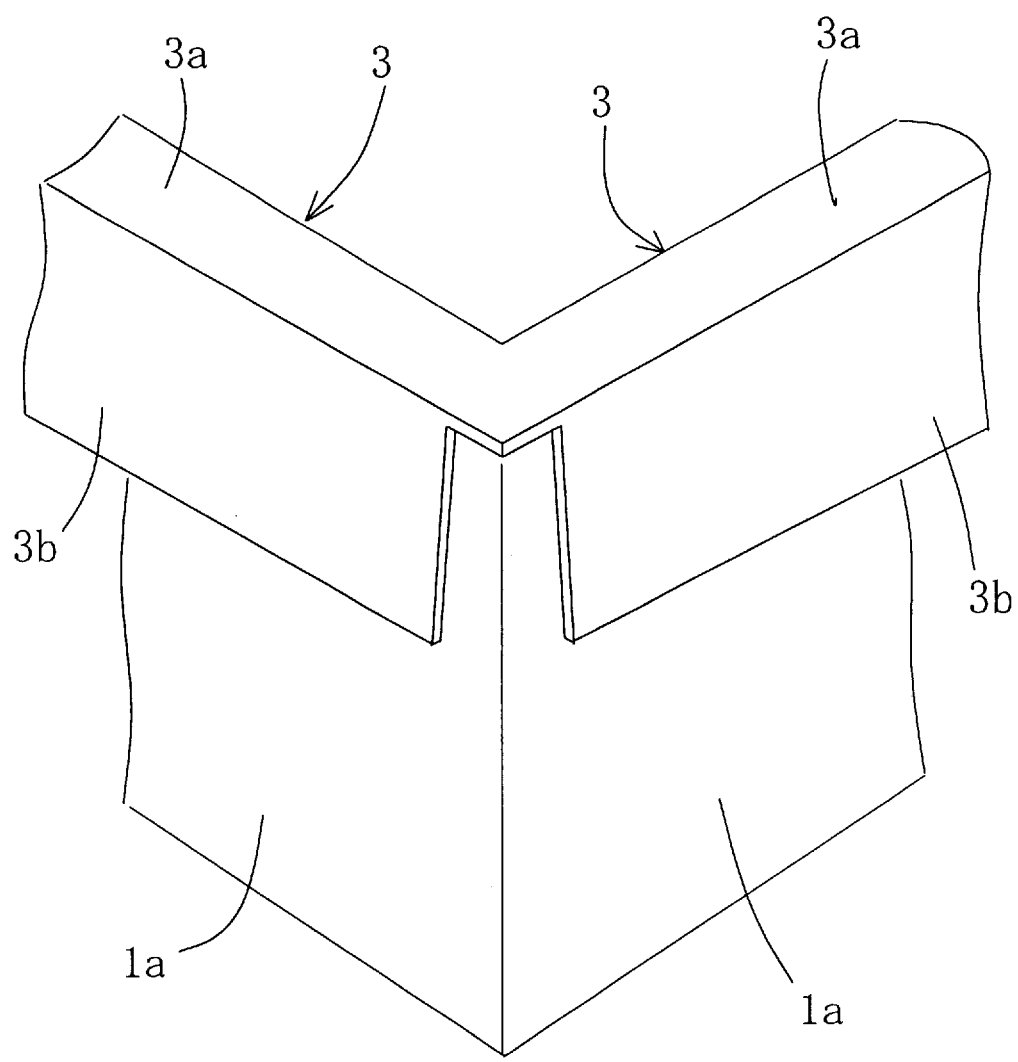
FIG. 3 is also an enlarged perspective view showing the corner part B in FIG. 1.
Figure 4:
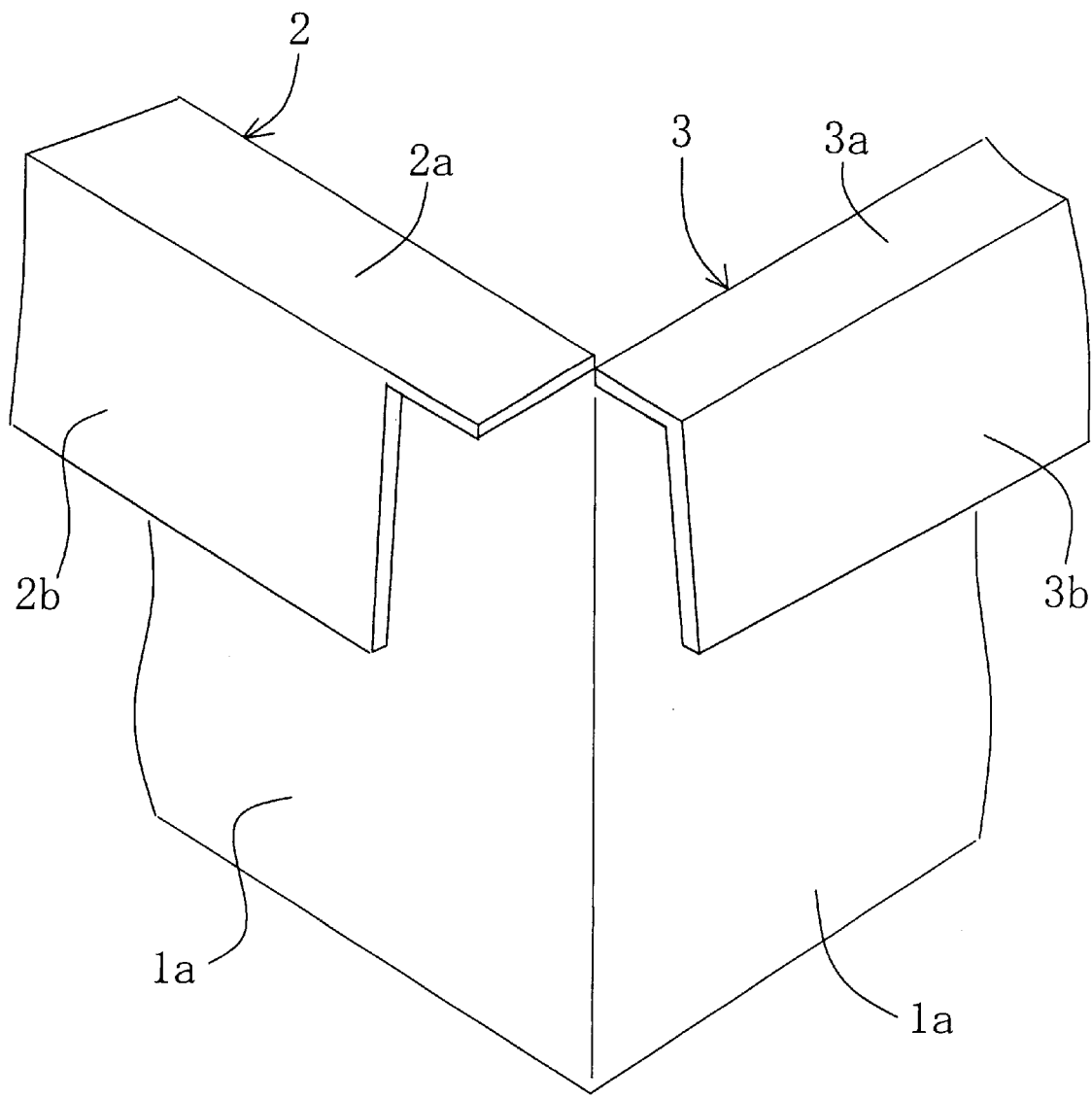
FIG. 4 is also an enlarged perspective view showing the corner part C in FIG. 1.
Figure 5:
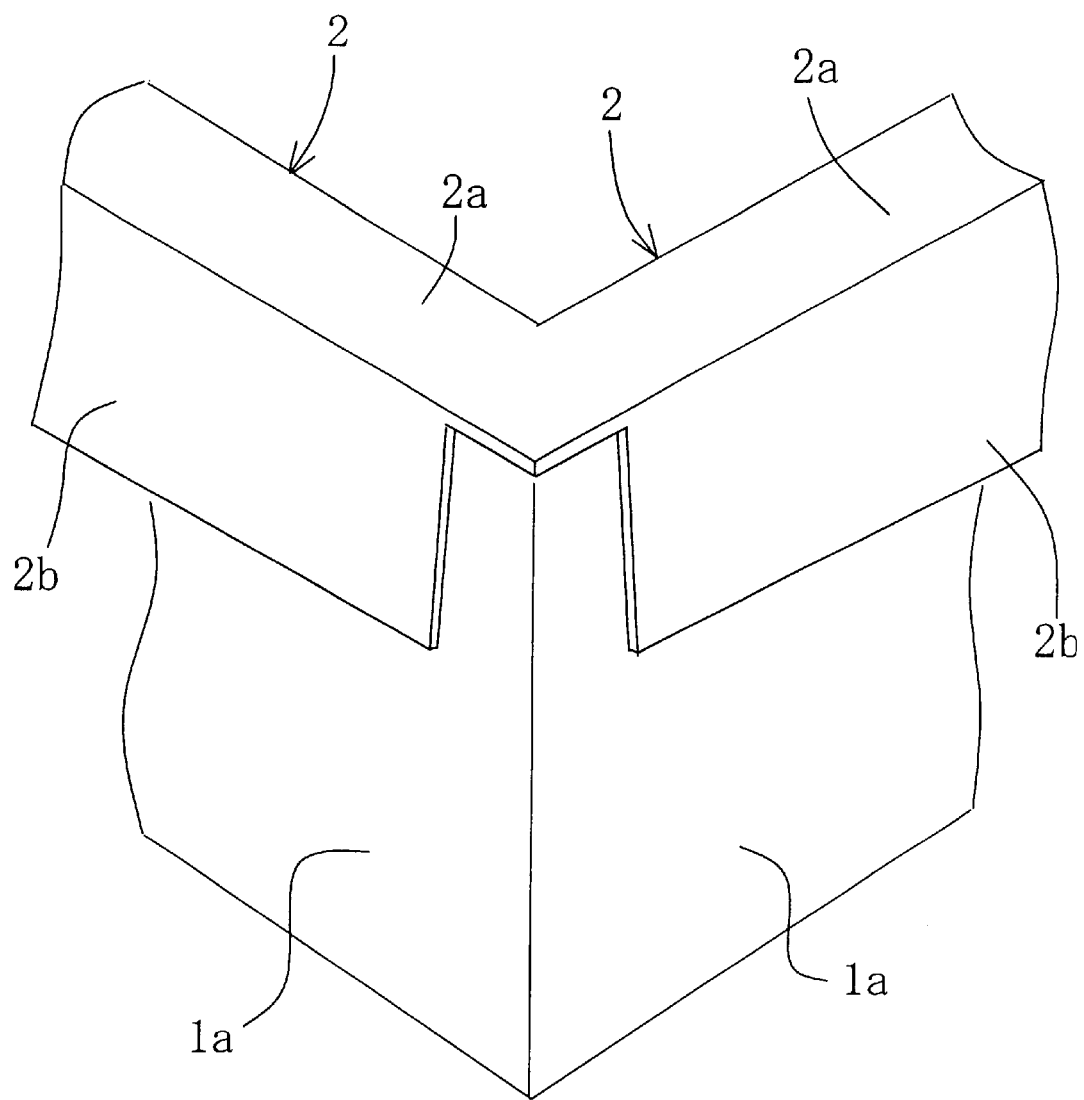
FIG. 5 is also an enlarged perspective view showing the corner part D in FIG. 1.

The water-storing tray 1 for the plant cultivation mat according to the first embodiment of the present invention consists, as shown in FIG. 1, of a single cell in the rectangular shape with its bottom part 1b being depressed to constitute a water-storing vessel. At each of the upper end parts of the side walls 1a of the two meeting faces at the corner part D positioned at the right side (corner part) of the water-storing tray 1, there is provided a substantially hook-shaped linkage part 2 in its cross-section and having a large breadth on its upper surface (vide: FIG. 5). On the other hand, at each of the upper end parts of the side walls 1a of the two meeting faces at the corner part B positioned at the left side (corner part) of the water-storing tray 1, there is provided a substantially hook-shaped linkage part 3 in its cross-section and having a small breadth on its upper surface (vide: FIG. 3). Both linkage part 2 of large breadth and linkage part 3 of small breadth consist of the upper surfaces 2a, 3a and the pendent parts 2b, 3b, as shown in FIGS. 2 to 5.

The side wall 1a, on the top of which the linkage part 2 with the large breadth is provided, is brought to a level higher than the side wall 1a provided in the linkage part 3 with the narrow breadth, for the thickness of the plate constituting the top surface 3a of the linkage part 3 having the small breadth. In other words, this linkage part 2 having the large breadth is provided at a position higher than the linkage part 3 having the small breadth for the abovementioned plate thickness (vide: FIGS. 2 and 4). At the corner part of the water-storing tray 1 where the linkage part 2 having the large breadth and the linkage part 3 having the small breadth meet each other, when the water-storing trays 1 are laid in mutual contiguity, a part of the pendent parts 2b, 3b are cut out, as shown in FIGS. 2 to 5. The cut-out length of the pendent parts 2b, 3b is for creating such a state, wherein the superposition of the adjacent linkage parts 2, 3 is not hindered, and it may be determined arbitrarily.

Figure 6:
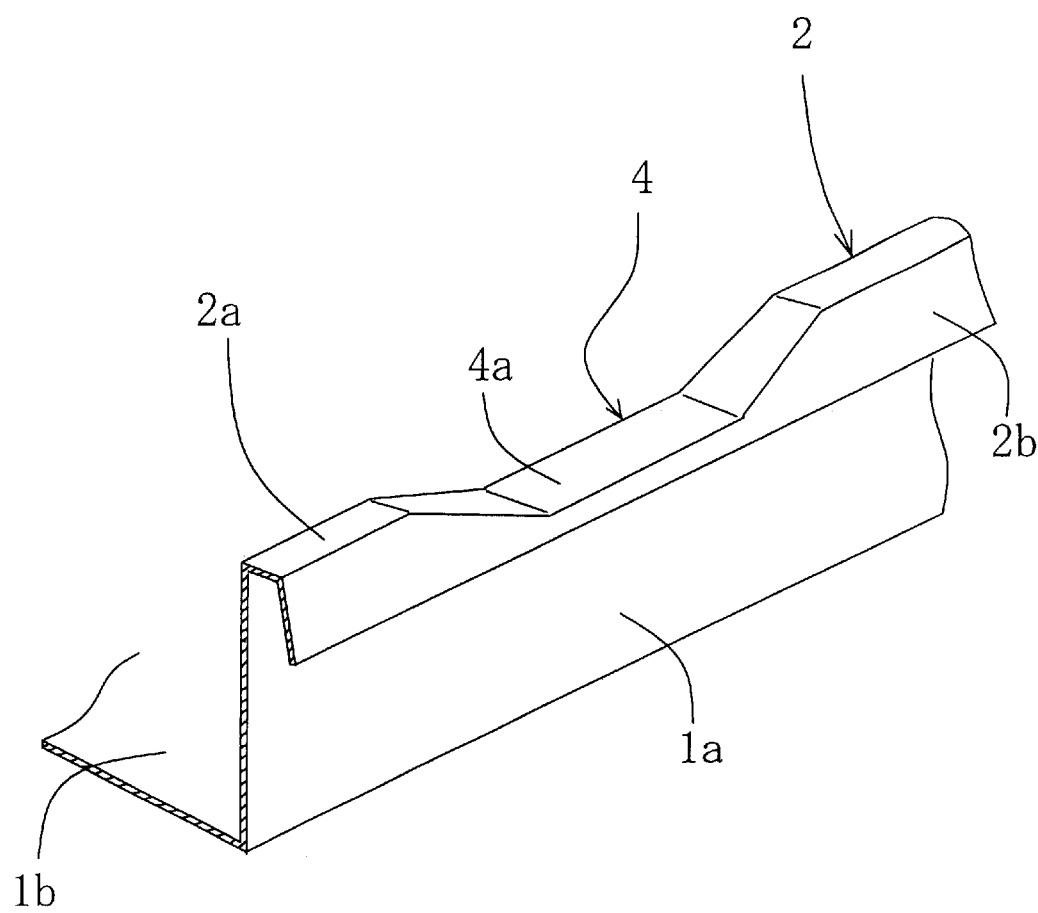
FIG. 6 is also an enlarged perspective view showing the corner part E in FIG. 1.

At the substantially center part of each upper end part of the side wall 1a of the water-storing tray 1, there is formed a concaved groove 4 for passage of water (vide: FIGS. 1 and 6). This concaved groove 4 is of such a dimensional construction that it may fit with one another, when the linkage part 2 having the large breadth is to be superposed on the linkage part 3 having the small breadth, of the water-storing tray 1 to be disposed in contiguity. The bottom surface 4a of the concaved groove 4 with a large breadth constituting the water level of the water-storing tray 1.

The plant cultivation mat 10, shown in FIG. 1, to be received in the water-storing tray 1 assumes a substantially rectangular shape, a cell 11 of which is depressed in such a manner that the upper part thereof may be left open. The cell 11 may be provided in a plurality of numbers in their depressed form. At the right side of FIG. 1, there is formed an inwardly recessed part 12 at the lower part of two mutually adjacent side walls 11a. Also, at the left side of FIG. 1, the other mutually adjacent two side walls 11a form a mild inward tapering surface extending from its upper part toward its lower part.

From the lower part of the side wall 11a of the cell 11 toward the center of the bottom surface 11b of the cell 11, there is formed a low raised part 13. In the upper end surface of the low raised part 13 in the vicinity of the center of the cell 11, there is perforated a water passage port 14. This low raised part 13 forms, in its inside, a space in the inverted "U" shape to define an opening 15 which is in the form of a concaved groove. Surplus water in the plant cultivation mat 10 is drained through the opening 15 of the water passage port 14 into the water-storing tray 1. Incidentally, around the upper periphery of the plant cultivation mat 10, there is provided a rib 16 as a reinforcing member, which may though be dispensed with, if the plant cultivation mat 10 itself possesses sufficient and required mechanical strength.

The shape, size and number, etc. of the water passage port 14 and the opening 15 may be arbitrarily determined, depending on the construction of the plant cultivation mat 10 and the cell 11. These parts may be located anywhere in the bottom part 11b or in the vicinity of the bottom part. The same can be applied to the ensuing embodiments of the present invention. Also, these dimensional factors of the water discharging parts are not to impose any limitation to the construction, size and others of the plant cultivation mat 10, but embrace all types of the plant cultivation mat 10, to which the present invention is applicable.

As the material for the water-storing tray 1 and the plant cultivation mat 10, use may preferably be made of synthetic resins such as vinyl chloride, polypropylene, polyester, polyethylene, polystyrene, and others. These tray and mat may be made by various molding methods such as vacuum molding, blow molding, injection molding, extrusion molding, and so forth. The size of the water-storing tray 1, the plant cultivation mat 10, and the cell 11 may be arbitrarily selected from, for example, 25 cm×25 cm, 50 cm×50 cm, etc., and the mutual relationship between the height of the water-storing tray 1 and the height of the plant cultivation mat 10 may be such one that the water-storing tray 1 constructs the water irrigation device in the bottom surface.

In the actual use of the afore-described water-storing tray 1 and the plant cultivation mat 10, the water-storing tray 1 is laid over the mat laying surface, in which the plant cultivation mat 10 is placed. Inside the plant cultivation mat 10, there are filled, through a filter, various plant growing ingredients such as earth brought from other place and mixed with the soil, light-weight artifical soil, and so on.

Seeds are then sowed over the plant growing ingredients, or grasses, flowers, or shrubs are planted. Thereafter, water is spread over the plant cultivation mat 10 by use of a watering pot, etc. In the meantime, water supply to the water-storing tray 1 is done by means of water supply pipe.

The water as supplied is stored in the water-storing tray 1 up to the height of the bottom surface 4a of the concaved groove 4 for the water passage, which controls the level of the water stored therein. In this case, the lower part of the plant cultivation mat 10 in the water-storing tray 1 is in its filled state, hence the plant growing ingredients inside the mat is also soaked with water, which is spread onto the top surface of the plant growing ingredients by the capillary action, making it possible to maintain growth of the seeds and plants.

Thereafter, the surplus water from the rainfall, the water sprinkling over and above the plant cultivation mat 10, and others flows out into the water-storing tray 1 through the water passage port 14 and the opening 15 formed in the cell 11 of the plant cultivation mat 10 and stored in the tray. If and when the plant growing ingredients in the cell 11 falls short of water, water in the tray 1 is led into the opening 15 of the cell 11 and is absorbed by the capillary action through the water passage port 14.

Since the water-storing tray 1 is of the above-described construction, it is possible to realize a bottom surface irrigation device for the plant cultivation mat 10 having a larger area by combining a multitude of the water-storing trays 1 in such a manner that the upper surface 2a of the linkage part 2 having the large breadth and the upper surface 3a of the linkage part 3 having the small breadth of the adjacent water-storing tray 1 are connected together. Further, by adjusting the height of the linkage part 2 having the large breadth and the linkage part 3 having the small breadth, and forming a cut-out portion in the pendent parts 2b, 3b of the water-storing tray 1 at their corner part, the bottom surface 1b of each water-storing tray 1 can be laid over the mat laying surface without its being floated from the surface, whereby the upper end part of the water-storing tray 1 is rendered flush.

Figure 7:
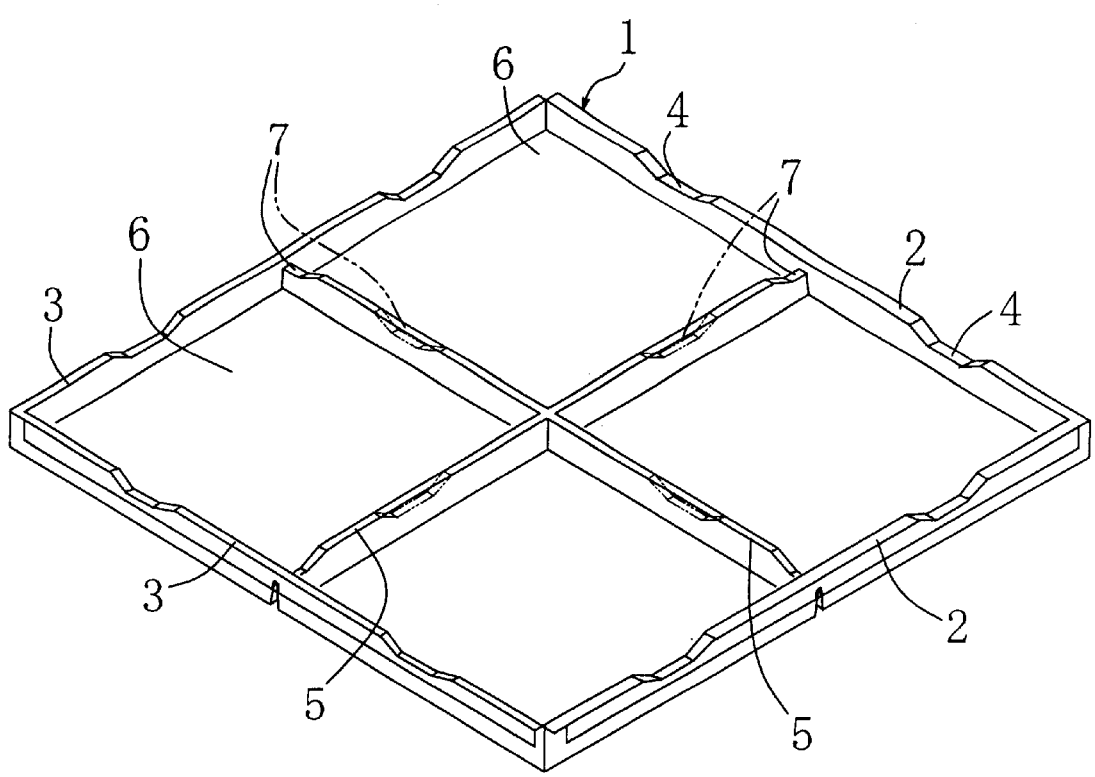
FIG. 7 is a perspective view showing the second embodiment of the water-storing tray according to the present invention.

Further, in reference to FIG. 7, explanations will be given in the following as to the second embodiment of the water-storing tray 1 according to the present invention. As shown in the drawing, the water-storing tray 1 is of such a construction that four water storage cells 6 are joined together by a cross-shaped connecting rib 5, whereby the water-storing tray 1 as a whole is defined into four water storage cells 6. That is to say, the connecting rib 5 serves for the partitioning member. A space is defined between the water storage cells 6 below the connecting rib 5. On the upper end part of the outer wall of each water storage cell 6, there is formed the concaved groove 4 for water passage in the same manner as in the afore-described first embodiment.

The connecting rib 5 for defining the water-storing tray 1 should preferably have its height not exceeding the height of the linkage part 2 having the large breadth on the outer side wall of the water-storing tray 1. On each side end part of the abovementioned connecting rib 5, there is integrally formed the concaved groove 7 for the water passage at each connecting part with the inside of the side wall of the water-storing tray 1, through the groove of which water is introduced into each water storage cell 6. The concaved groove 7 for the abovementioned water passage may be formed at the substantially center part of each side of the connecting rib 5, as indicated by the double-dot-and-dash lead line for FIG. 7.

Figure 8:
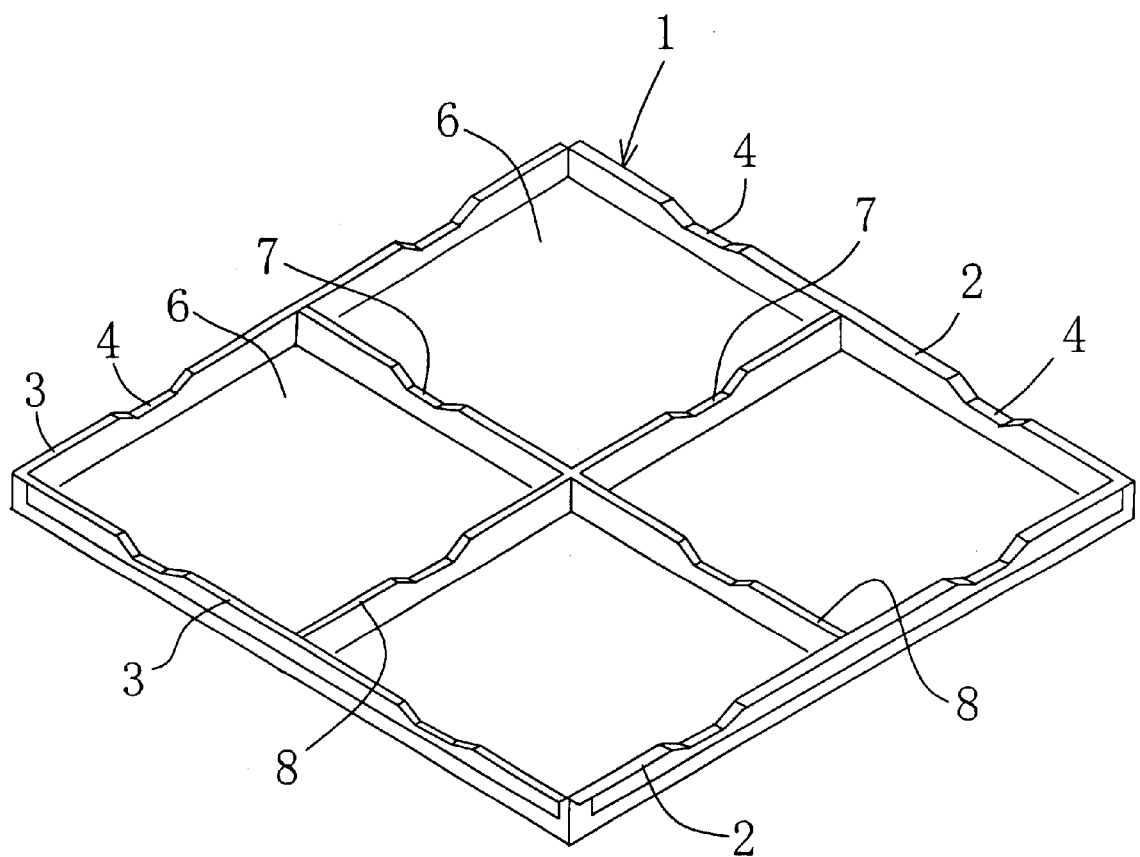
FIG. 8 is also a perspective view showing the third embodiment of the water-storing tray according to the present invention.

Furthermore, the water-storing tray 1 of the third embodiment according to the present invention, which is similar to the second embodiment thereof is of such construction that, as shown in FIG. 8, the cross-shaped partitioning member 8 is formed in the water-storing tray 1 to thereby define four water storage cells 6 in the water-storing tray 1. On the upper end part of the external side wall of each water storage cell 6, there is provided the concaved groove 4 for water passage, same as the abovementioned mode of embodiment.

The partitioning member 8 for defining the water-storing tray 1 should preferably have its height not exceeding the height of the linkage part 2 having the large breadth on the outer side wall of the water-storing tray 1. At the substantially center part of each of the partitioning member 8 which defines each water storage cell 6 in the water-storing tray 1, there is integrally formed the concaved groove 7 for the water passage. It is arbitrary that the partitioning member 8 might be moulded integrally with the water-storing tray 1, or it might be provided in the water-storing tray 1, as a separate member.

The above-described second and third embodiments of the present invention are the same as the afore-described first embodiment, in respect of the following points: a) the linkage part 2 of substantially hook-shape in cross-section and having the large breadth part on its upper surface is integrally provided in the external direction, on the upper end part of the two mutually adjacent outer walls which are positioned at the right side of the water-storing tray 1 shown in FIG. 1, while the linkage part 3 of substantially hook-shape in cross-section and having the small breadth part on its upper surface is integrally provided in the external direction, on the upper end part of the two mutually adjacent outer walls which are positioned at the left side of the water-storing tray 1 shown in FIG. 1; b) the side wall 1a of the water-storing tray 1 provided with the linkage part 2 having the large breadth is positioned at a level higher than the side wall 1a of the linkage part 3 having the small breadth, for the plate thickness of the upper surface 3a of the linkage part 3 having the small breadth (vide: FIGS. 2 and 4); and c) at the corner part where the linkage part 2 having the large breadth and the linkage part 3 having the small breadth of the water-storing tray 1 meet each other, the linkage parts 2, 3 of substantially hook-shape in cross-section, consisting of the upper surfaces 2a, 3a and the pendent parts 2b, 3b, are cut out.

Incidentally, in the above-described first to third embodiments of the water-storing tray 1 according to the present invention, it might be arbitrary to form the concaved groove 4 for the water passage, which has been formed on the upper end part of the peripheral side wall 1a, in the two mutually opposed side walls 1a alone, to restrict the direction of water passage, depending on the environment for laying the water-storing tray 1, and other conditions. It might also be arbitrary, depending on the environment for laying the water-storing tray 1, and other conditions, to cut, in an appropriate size, the upper surfaces 2a, 3a and the pendent parts 2b, 3b of the linkage parts 2, 3 which come into contact with the cross-shaped connecting rib 5, and to cut all four corner parts of each lateral end part of the linkage part 2 having the large breadth on its upper surface and the linkage part 3 having the small breadth on its upper surface, in order to increase an effect that the bottom surface 1b of each water-storing tray 1 can be laid over the mat laying surface without its being floated from the surface.

Figure 9:
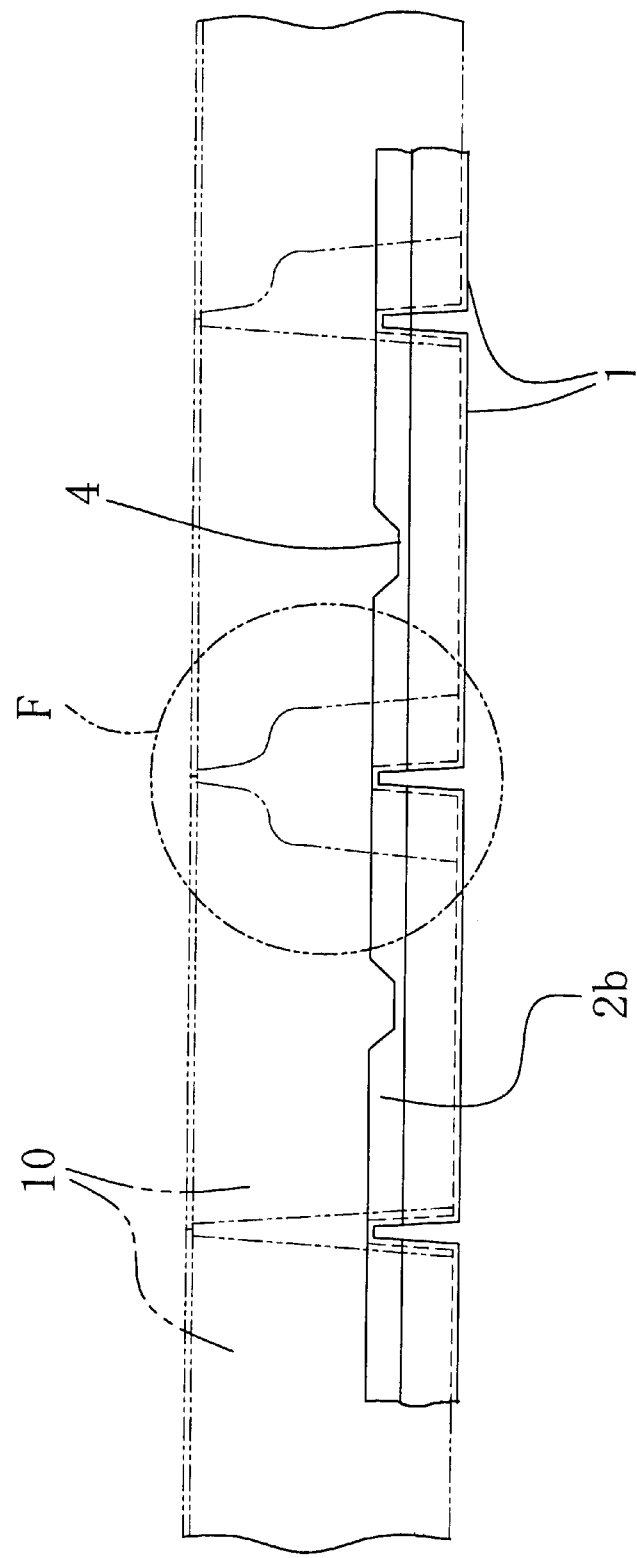
FIG. 9 is a front view showing a state, wherein the water-storing tray of the first embodiment according to the present invention is laid.
Figure 10:
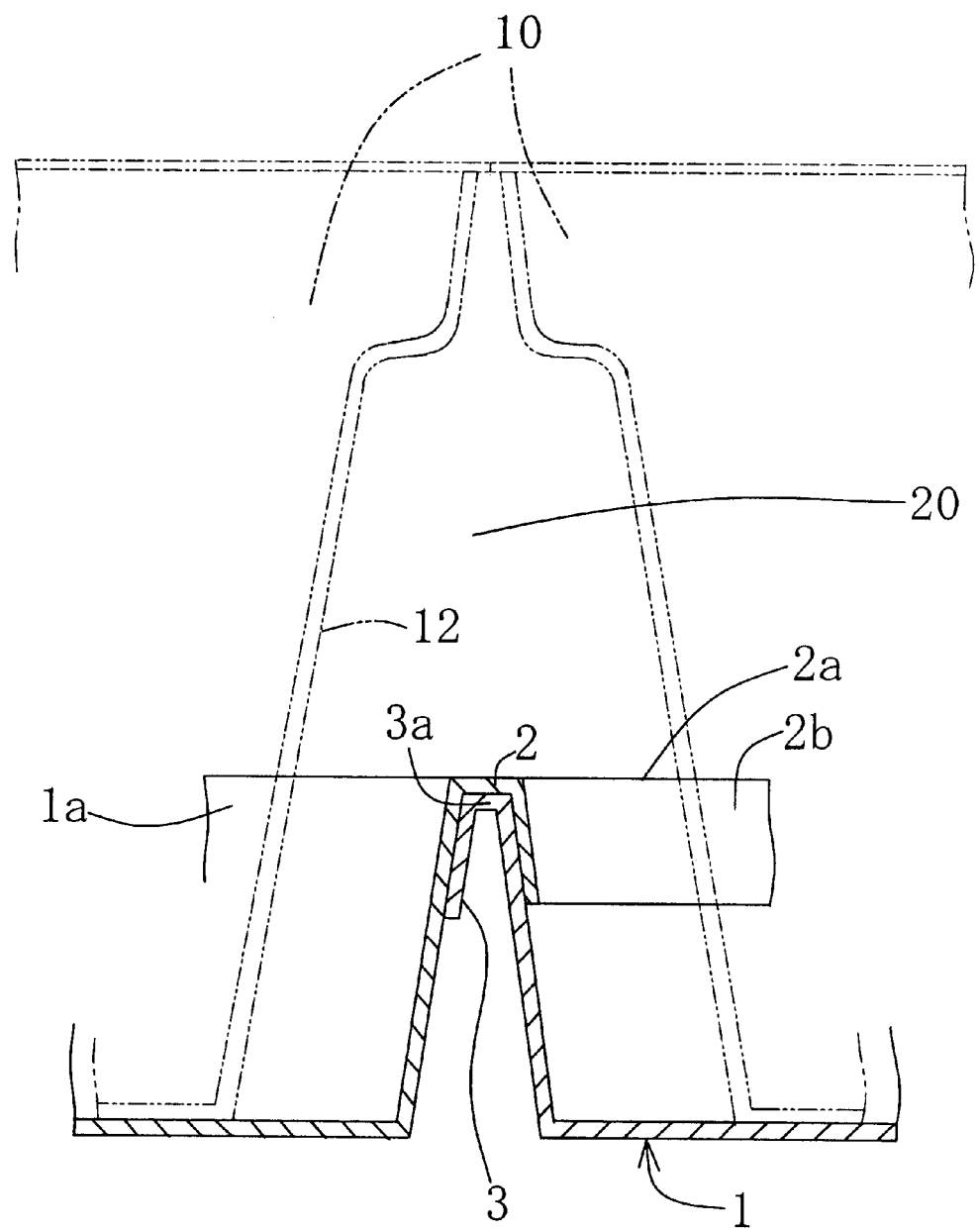
FIG. 10 is an enlarged cross-sectional view showing in detail the encircled part F in FIG. 9.

In the following, explanations will be given as to the case, wherein the water-storing tray 1 is laid on the laying surface for the plant cultivation mat. FIG. 9 indicates a state of use of the water-storing tray, wherein a plurality of water-storing trays 1 are joined together by the linkage parts 2, 3 having the substantially hook-shape in cross-section, and laid on the mat laying surface, followed by placing in this water-storing tray 1 the plant cultivation mat 10 shown in FIG. 1 with a dot-and-dash line. FIG. 10 indicates the state of engagement of the linkage parts 2, 3 of the water-storing tray 1 at the encircled part F in FIG. 9 as well as its positional relationship with the plant cultivation mat 10.

The plant cultivation mat 10 as shown in FIG. 1 to be placed in the water-storing tray 1 has an inwardly recessed part 12 at the lower part of the two mutually adjacent side walls 11a, while the other two mutually adjacent side walls 11a form a gentle inwardly tapered surface extending from the upper part toward the lower part After laying a plurality of water-storing tray 1 on the mat laying surface, a plurality of plant cultivation mats 10 are spread within the water-storing tray 1 in a predetermined direction, whereby the space enclosed by the upper end surface of the side wall 1a of the water-storing tray 1 and the inwardly recessed part 12 formed at the mutually opposed side walls 11a of each plant cultivation mat 10 can be effectively used as the space part 20 for disposing the water supply pipeline.

It may be noted that, in the water-storing tray 1, the side wall 1a with the linkage part 2 having the large breadth is provided at a level higher than the side wall 1a with the linkage part 3 having the small breadth, for the plate thickness of the upper surface 3a of the linkage part 3 having the small breadth. Accordingly, as shown in FIG. 10, when a plurality of water-storing tray 1 are laid on the mat laying surface, the linkage part 2 having the large breadth of one water-storing tray 1 and the linkage part 3 having the small breadth of another water-storing tray 1 to be disposed adjacently are laid one on the other in superposition, there is no possibility of the bottom surface part 1b of each water-storing tray 1 floating over the mat laying surface.

Here, a modification of the plant cultivation mat 10 according to the present invention will be explained in reference to FIG. 11. The plant cultivation mat 10 shown in this figure of drawing consists of a single cell 11 having a hollow post 17 at the bottom surface 11b thereof. Each of the lower parts of the four surrounding side walls have the inwardly recessed part 12 formed therein. A rib 16 is provided on and around the periphery of the plant cultivation mat 10, which serves as the reinforcement member.

At five positions in the bottom surface 11b of the plant cultivation mat 10, there are integrally formed the hollow posts 17 which communicate with the interior of the plant cultivation mat 10. At the bottom part 17a of the hollow post 17, there is formed a water passage port 14 extending from the side surface of the post 17 over to its bottom surface. The bottom surface part 17a of the remainder of the post 17, where no water passage port 14 is formed, constitutes a support for the cell 11 of the plant cultivation mat 10. That is to say, this structure is such that the support part of the bottom surface of the hollow post 17 is positioned at a lower level than the bottom surface 11b of the cell 11 for a predetermined size so as to be able to adjust the level of water irrigation with respect to the water-storing tray 1 for the plant cultivation mat 10. Incidentally, the inner space of the hollow post 17 may be filled with a substance having an appropriate water absorbing property such as, for example, pearlite, non-woven cloth, or others.

Figure 11:
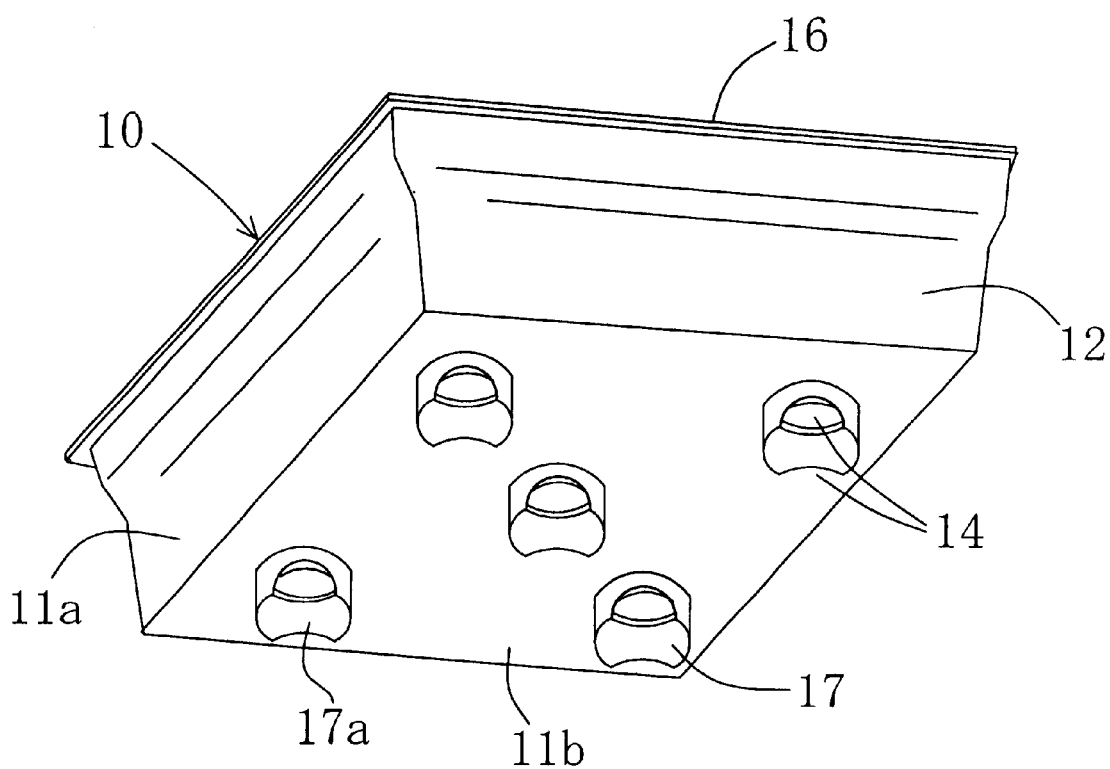
FIG. 11 is a bottom perspective view showing a modification of the plant cultivation mat according to the present invention.
Figure 12:
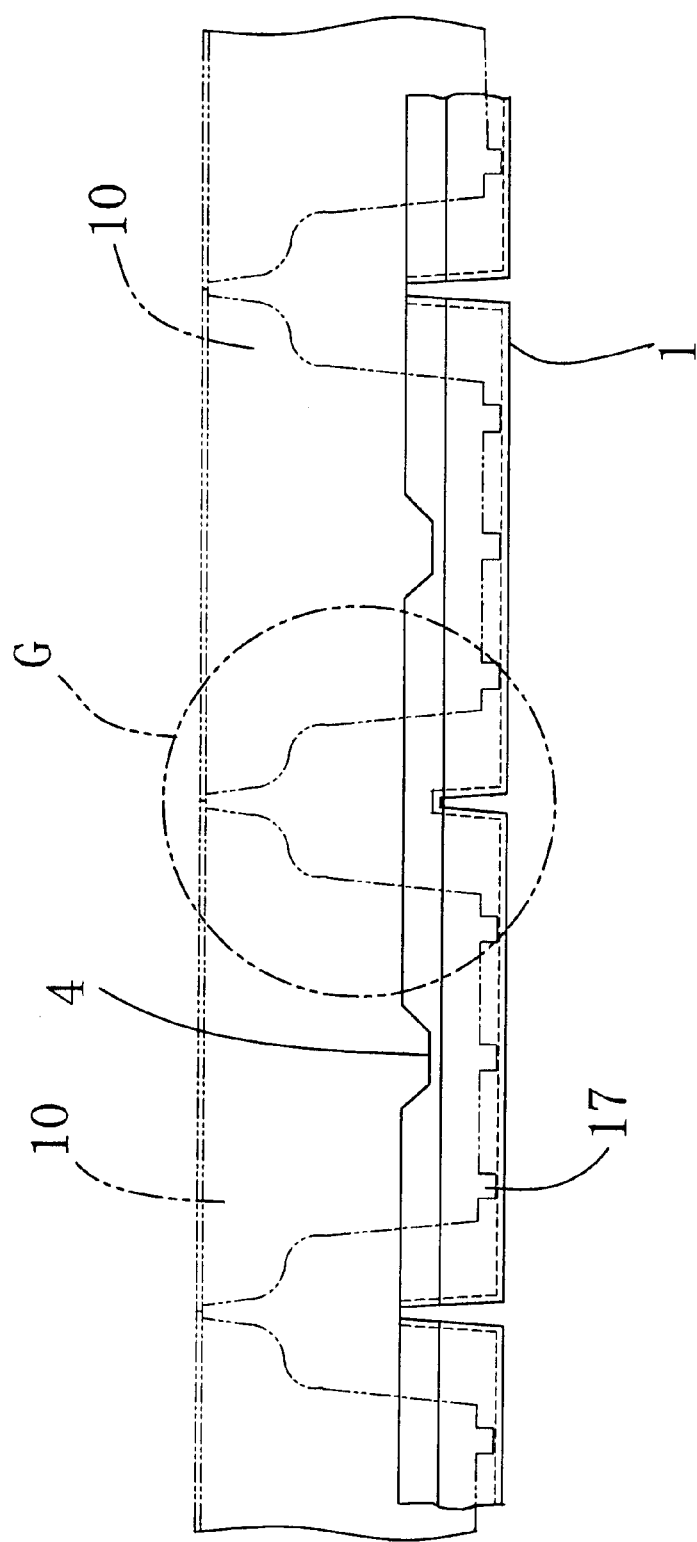
FIG. 12 is a front view showing a state, wherein the water-storing tray of the second embodiment according to the present invention is laid.
Figure 13:
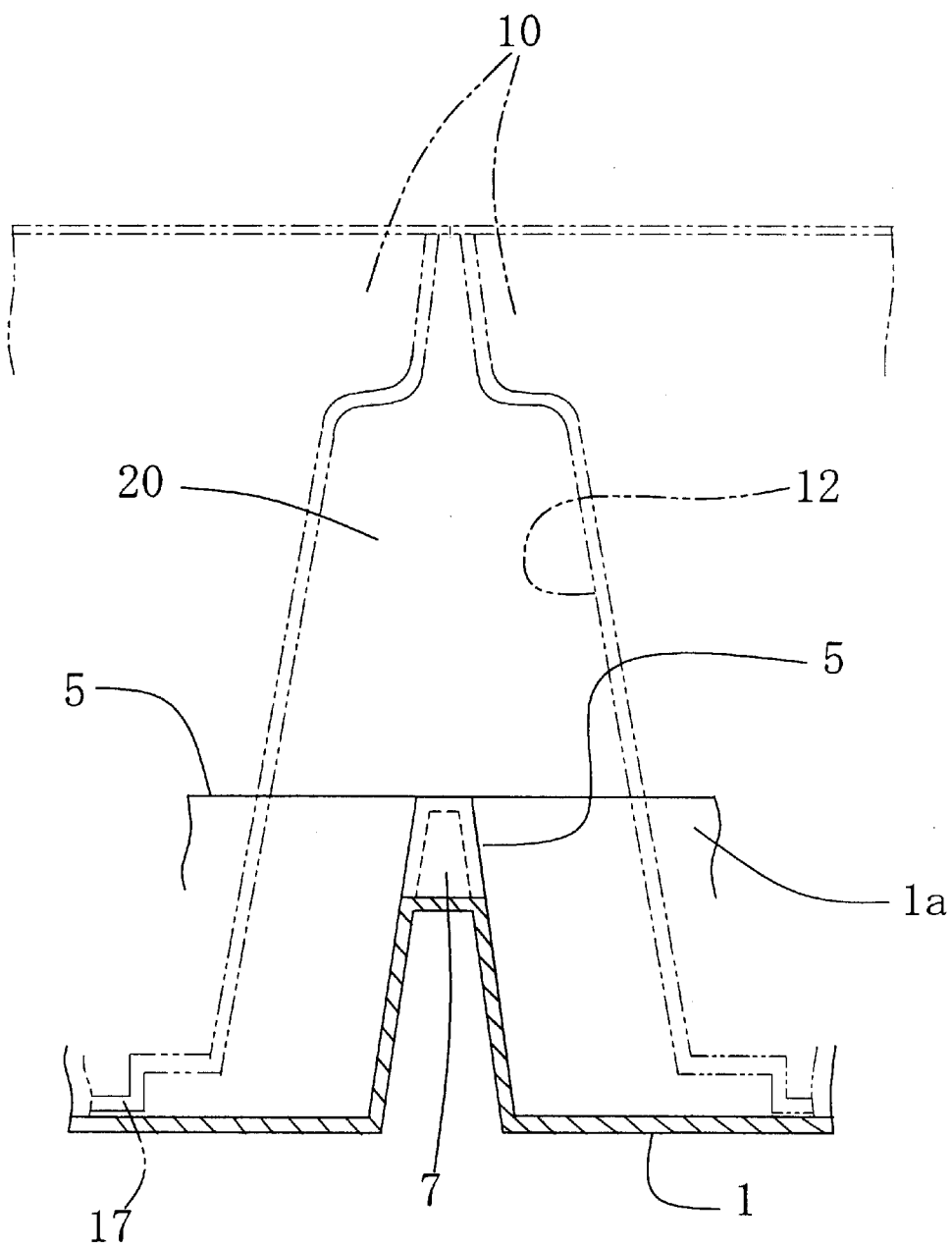
FIG. 13 is an enlarged cross-sectional view showing in detail the encircled part G in FIG. 12.

FIGS. 12 and 13 illustrate a case, wherein the water-storing tray 1 of the second embodiment is laid on the mat laying surface and the plant cultivation mat 10 as shown in FIG. 11 is placed in the water-storing tray 1. In this illustrated embodiment, a plurality of water-storing trays 1 shown in FIG. 7 are connected by means of the linkage parts 2, 3 of a substantially hook-shape in cross-section, and then laid on the mat laying surface, followed by placing the plant cultivation mat 10 in each of the water-storing trays 1.

The plant cultivation mat 10 to be accommodated in the water-storing tray 1 has the inwardly recessed part 12 formed at the lower part of the surrounding four side walls 11a. After laying a plurality of water-storing tray 1 on the mat laying surface, a plurality of plant cultivation mats 10 are spread in the water-storing tray 1, whereby the space surrounded by the upper end surface of the side wall 1a of the water-storing tray 1 and the inwardly recessed part 12 of the mutually opposed side walls 11a of each plant cultivation mat 10 can be effectively utilized as the space part 20 for disposing the water supply pipeline.

The concaved groove 7 for the water passage as formed in the connecting rib 5 of the water-storing tray 1 is of such a construction as shown in FIG. 13, wherein the bottom surface of the concaved groove 7 is flush with, or lower than, the height of the bottom surface of the concaved groove 4 formed in the external side wall 1a of the water-storing tray 1 as shown in FIG. 12.

In the next place, explanations will be given as to the method of laying the water-storing tray 1 according to the present invention on the mat laying surface. In general, the slab set on the roof top, etc. of a building has a predetermined inclination for draining rainwater, etc.. The water-storing tray 1 of the present invention is to be effectively laid on and along this inclined surface.

First of all, in setting the first water-storing tray 1 on the mat laying surface having inclination, the side wall 1a provided with the linkage part 2 having the large breadth is positioned downward of the inclined surface for its laying. At this time, the upward position of the water-storing tray 1 constitutes the external side wall 1a provided with the linkage part 3 having the small breadth. And then, the linkage part 2 having the large breadth provided on the side wall 1a of the second water-storing tray 1 for laying is placed and connected on the linkage part 3 having the small breadth.

On the other hand, as to the left and right directions of the first water-storing tray 1, arrangement is such that the linkage part 2 having the large breadth of the third adjacent water-storing tray 1 is engaged with the linkage part 3 having the small breadth, and the linkage part 3 having the small breadth of the fourth adjacent water-storing tray 1 is engaged with the linkage part 2 having the large breadth. In this way, the water-storing trays are sequentially joined together, and laid on the mat laying surface.

By the abovementioned setting of the water-storing trays, one side of the pendent part 2b joined to the upper surface 2a of the linkage part 2 having the large breadth of the water-storing tray 1 is constantly positioned downward of the inclined surface for the laying, at their engaged portion. Accordingly, when water is supplied from upward position of the inclined surface for the setting of the water-storing tray 1, as laid in a broad range, the water as supplied passes along and through the concaved groove 4 (or 7) formed at an appropriate location in the linkage part 2, 3 of the substantially hook-shape in its cross-section, and sequentially extends to the water-storing trays 1 located downward. Therefore, this is the very effective method of laying the water-storing tray 1 for the water irrigation of the bottom surface of the plant cultivation mat 10, because there takes place no water leakage between the adjacent water-storing trays 1.

Although mention has been made in the foregoing, the space part 20 to be defined between the upper end part of the side wall 1a of the water-storing tray 1 (or the upper end part of the connecting rib 5, or the upper end part of the partitioning member 8), and the mutually opposed side wall 11a of the plant cultivation mat 10 having the recessed part 12 at its lower part can sufficiently accommodate the water supply pipeline. By laying the water supply pipeline in this space part 20 with a predetermined routing, it is possible to construct the automatic water irrigation device.

The water-storing tray 1 applicable to the present invention has diversified configuration and construction, so that it embraces every kind of modifications within the scope of the present invention. In the particular embodiments as described in the foregoing, a water-storing tray 1 in a substantially rectangular shape has been exemplified. The shape, however, is not limited to the rectangular shape, but any other shape may be adopted, such as, for example, triangle, hexagon, or other shapes, provided that it is capable of providing the linkage part on the side wall, and of connecting a plurality of water-storing trays by joining them with use of this linkage part. In particular, when the linkage part 2 having the large breadth and the linkage part 3 having the small breadth are provided, in the same numbers, on the even number polygons such as square, right hexagon, etc., it becomes possible to connect the water-storing tray of one and same product.

Moreover, when the water-storing tray 1 is to be spread on the mat laying surface, the water-storing tray 1 in an appropriate configuration is selected from among various water-storing trays, which are then combined properly to be laid on the mat laying surface, hence its adaptability is very broad.

Since the water-storing tray for the plant cultivation mat, and the method for laying the same, according to the present invention, is of such construction as has been described in the foregoing, it has such effect that the water irrigation function for the plant cultivation mat is ameliorated and control of the water content in the soil can be facilitated.

The present invention has further effect such that the plant cultivation arrangement as a whole can be made much more stabilized on the mat laying surface, while improving the water irrigation function of the plant cultivation arrangement using the plant cultivation mat.

Although the present invention has been described in detail in the foregoing with reference to the preferred embodiments thereof as shown in the drawing, the invention is not limited to these embodiments alone, but those persons skilled in the art may be able to make various improvements in, and modifications to, these embodiments without departing from the spirit and scope of the invention as recited in the appended claims.

What is claimed is:

1. A water-storing tray for plant cultivation mat, wherein a first linkage part of a substantially hook-shape in cross-section, said first linkage part of a substantially hook-shape in cross-section comprising an upper surface and a pendent part attached to the upper surface and having a large breadth on the upper surface, is provided externally on the upper end part of at least one side wall of the water-storing tray, and a second linkage part having a substantially hook-shape in cross-section, said second linkage part of a substantially hook-shape in cross-section comprising an upper surface and a pendent part attached to the upper surface and having a small breadth on its upper surface, is provided externally on the upper end part of the other side wall.

2. A water-storing tray for plant cultivation mat according to claim 1, which is characterized in that, each of the side end parts of said linkage part having the large breadth on its upper surface and sail linkage part having the small breadth on its upper surface is cut out at a required location.

3. A water-storing tray for plant cultivation mat according to claim 2, which is characterized in that the upper surface of said linkage part having the large breadth on the upper surface is brought to a level higher than the upper surface part of said linkage part having the small breadth on the upper surface.

4. A water-storing tray for plant cultivation mat according to claim 1, which is characterized in that the upper surface of said linkage part having the large breadth on the upper surface is brought to a level higher than the upper surface part of said linkage part having the small breadth on the upper surface.

5. A water-storing tray for plant cultivation mat as set forth in claim 1, which is characterized in that a plurality of water storage cells are defined within said tray by use of a partitioning member.

6. A water-storing tray for plant cultivation mat as set forth in claim 1, which is characterized in that concaved grooves are formed at required locations in the upper end part of the side walls thereof.

7. A water-storing tray for plant cultivation mat as set forth in claim 1, which is characterized in that the inside of said water-storing tray for the plant cultivation mat is defined into a plurality of water storage cells by means of a partitioning member, and a concaved groove for the water passage is formed at required locations in said partitioning member.

8. A water-storing tray for plant cultivation mat as set forth in claim 1, which is characterized in that the inside of said water-storing tray for the plant cultivation mat is defined into a plurality of water storage cells by means of a partitioning member, and a concaved groove for the water passage is formed at required locations in said partitioning member, and, at the same time, a concaved groove is formed at required locations in the upper end part of said side wall.

9. A water-storing tray arrangement for plant cultivation mat, which is characterized in that desired water-storing trays for the plant cultivation mat are selected for use from among the water-storing trays for the plant cultivation mat of a construction, wherein a linkage part having a substantially hook-shape in its cross-section and a large breadth on its upper surface is provided externally on the upper end part of at least one side wall of the water-storing tray, and a linkage part having a substantially hook-shape in its cross-section and a small breadth on its upper surface is provided externally on the upper end part of the other side wall, and said linkage part having the large breadth on its upper surface and said linkage part having the small breadth on its upper surface are mutually engaged to be arranged continuously on the mat laying surface.

10. A water-storing tray arrangement for plant cultivation mat a s set forth in claim 9, which is characterized in that, when said water-storing trays for the plant cultivation mat are mutually engaged with the linkage part having the large breadth on its upper surface and the linkage part having the small breadth on its upper surface to be arranged continuously on the mat laying surface, the side wall where said linkage part having the large breadth on its upper surface is positioned downward of the inclined mat laying surface to be arranged.

11. A water-storing tray arrangement for plant cultivation mat, which is characterized in that desired water-storing trays for the plant cultivation mat are selected for use from among the water-storing trays for the plant cultivation mat of a construction, wherein a linkage part having a substantially hook-shape in its cross-section and a large breadth on its upper surface is provided externally on the upper end part of at least one side wall of the water-storing tray, and a linkage part having a substantially hook-shape in its cross-section and a small breadth on its upper surface is provided externally on the upper end part of the other side wall, and said linkage part having the large breadth on its upper surface and said linkage part having the small breadth on its upper surface are mutually engaged to be arranged continuously on the mat laying surface, followed by spreading each of a plurality of plant cultivation mat in said water-storing tray, thereby rendering a space part formed between the upper end surface of the side wall of said water-storing tray and the opposed side wall of each said plant cultivation mat is made a space part for disposing the water supply pipeline.

12. A water-storing tray for plant cultivation mat, wherein a linkage part having a substantially hook-shape in cross-section and having a large breadth in it s upper surface is provided externally on the upper end part of at least one side wall of the water-storing tray, and a linkage part having a substantially hook-shape in cross-section and having a small breadth on its upper surface is provided externally on the upper end part of the other side wall, wherein each of the side end parts of said linkage part having the large breadth on its upper surface and said linkage part having the small breadth on its upper surface is cut out at a required location.

13. A water-storing tray for plant cultivation mat according to claim 12, wherein the upper surface of said linkage part having the large breadth on the upper surface is brought to a level higher than the upper surface part of said linkage part having the small breadth on the upper surface.

* * * * *